US012670058B2

(12) United States Patent
Sundaram et al.

(10) Patent No.: US 12,670,058 B2
(45) Date of Patent: Jun. 30, 2026

(54) LANGUAGE MODEL-ASSISTED SYSTEM INSTALLATION, DIAGNOSTICS, AND DEBUGGING

(71) Applicant: NVIDIA Corporation, Santa Clara, CA (US)

(72) Inventors: Sasikumar Neli Sundaram, Santa Clara, CA (US); Gunaseelan Ponnuvel, San Jose, CA (US); Chris Siao, South San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 46 days.

(21) Appl. No.: 18/402,876

(22) Filed: Jan. 3, 2024

(65) Prior Publication Data

US 2025/0217224 A1     Jul. 3, 2025

(51) Int. Cl.
*G06F 11/00* (2006.01)
*G06F 11/07* (2006.01)
*G06F 40/284* (2020.01)
*G06F 40/40* (2020.01)

(52) U.S. Cl.
CPC ........ *G06F 11/079* (2013.01); *G06F 11/0769* (2013.01); *G06F 40/284* (2020.01); *G06F 40/40* (2020.01)

(58) Field of Classification Search
CPC .. G06F 11/079; G06F 11/0769; G06F 40/284; G06F 40/40; G06F 11/0727; G06F 11/0787; G06N 20/00
See application file for complete search history.

(56) References Cited

U.S. PATENT DOCUMENTS

| | | | | |
|---|---|---|---|---|
| 9,189,465 B2 * | 11/2015 | Pilkington | ............ | G06F 40/284 |
| 9,274,874 B1 * | 3/2016 | Chamness | ............... | H04L 41/06 |
| 11,163,587 B2 * | 11/2021 | Miner | ...................... | G06F 8/658 |
| 11,461,163 B1 * | 10/2022 | Aggarwal | .......... | G06F 11/0787 |
| 12,506,653 B2 * | 12/2025 | Mermoud | ........... | H04L 41/0631 |
| 2010/0115340 A1 * | 5/2010 | Ruan | ................... | H04L 41/0813 |
| | | | | 714/E11.029 |
| 2016/0357519 A1 * | 12/2016 | Vargas | .................... | G06F 40/40 |
| 2017/0169342 A1 * | 6/2017 | Waltinger | ............. | G06F 11/008 |
| 2023/0041517 A1 * | 2/2023 | Golikov | ................. | G01D 21/02 |
| 2023/0368905 A1 * | 11/2023 | Rudorfer | ............... | G16H 40/20 |
| 2024/0411752 A1 * | 12/2024 | Prabhakar | .......... | H04L 41/0895 |
| 2024/0428626 A1 * | 12/2024 | Uchanski | ............. | G07C 5/0808 |
| 2025/0013524 A1 * | 1/2025 | Patel | ................... | G06F 11/0793 |
| 2025/0021547 A1 * | 1/2025 | Lewis | .................. | G06F 16/285 |
| 2025/0036513 A1 * | 1/2025 | Lozano | ................. | G06F 18/214 |

(Continued)

*Primary Examiner* — Jonathan D Gibson
(74) *Attorney, Agent, or Firm* — Lowenstein Sandler LLP

(57) ABSTRACT

Disclosed are apparatuses, systems, and techniques that train and use trained language models to assist users with complex systems installation, troubleshooting, and/or maintenance. The techniques include receiving, via a user interface (UI), a natural language (NL) query associated with one or more malfunction indicators indicative of a malfunction state of a system, providing, to a language model (LM) trained using a documentation associated with the system, an input having a prompt that is based at least on the NL query. The techniques further include receiving, from the LM, a response to the NL query, the response having one or more instructions associated with resolution of the malfunction state of the system and causing the UI to display the response.

20 Claims, 10 Drawing Sheets

(56) References Cited

U.S. PATENT DOCUMENTS

2025/0045137 A1 * 2/2025 Tadepalli ............ G06F 11/0766
2025/0201241 A1 * 6/2025 Zhong .............. G06F 16/33295
2025/0328412 A1 * 10/2025 Roh .................... G06F 11/0751

* cited by examiner

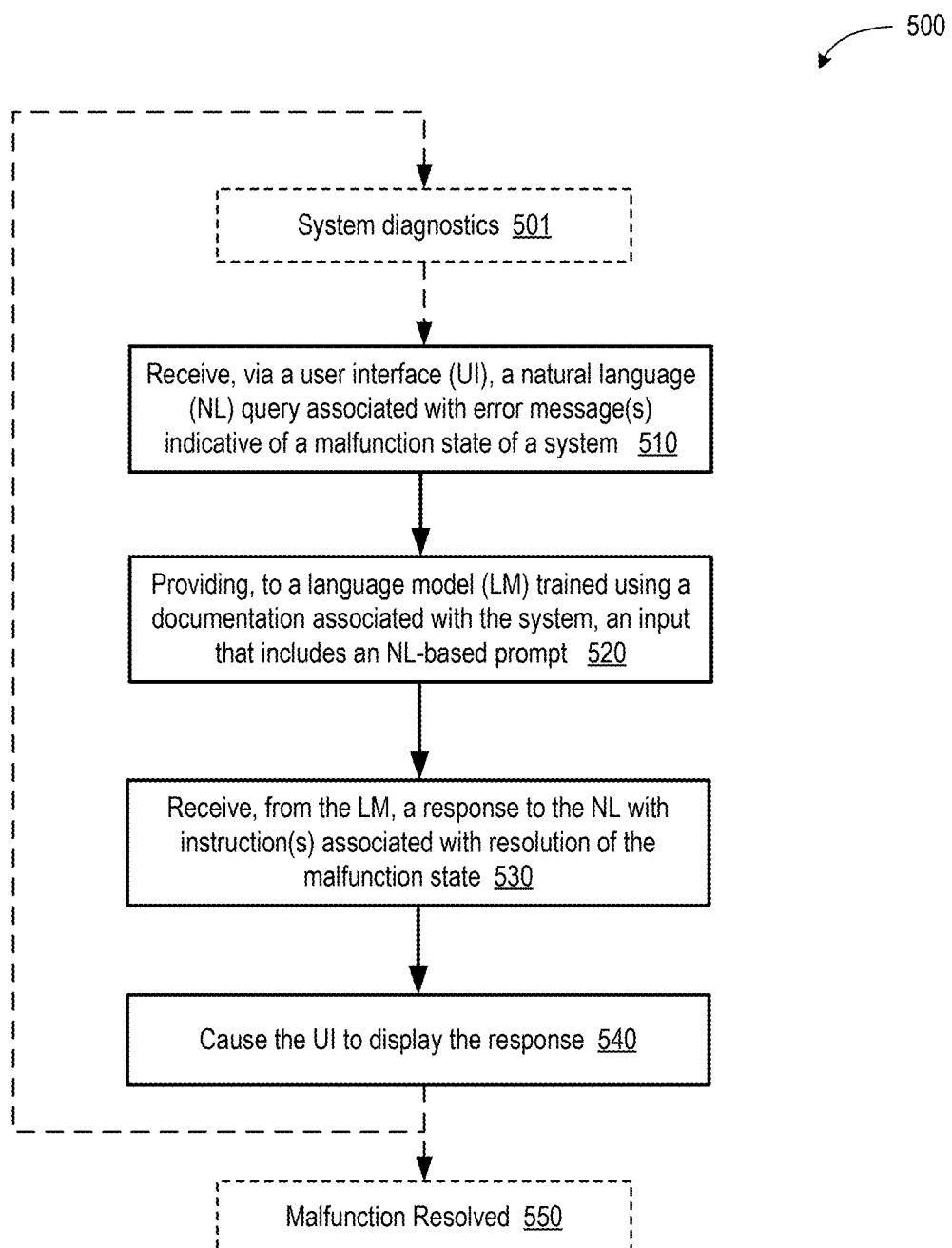

500

System diagnostics 501

Receive, via a user interface (UI), a natural language (NL) query associated with error message(s) indicative of a malfunction state of a system 510

Providing, to a language model (LM) trained using a documentation associated with the system, an input that includes an NL-based prompt 520

Receive, from the LM, a response to the NL with instruction(s) associated with resolution of the malfunction state 530

Cause the UI to display the response 540

Malfunction Resolved 550

FIG. 5

LANGUAGE MODEL-ASSISTED SYSTEM INSTALLATION, DIAGNOSTICS, AND DEBUGGING

TECHNICAL FIELD

At least one embodiment pertains to computing resources used to provide technical support for complex systems. For example, at least one embodiment pertains to systems and techniques that leverage language models to facilitate installation, diagnostics, and debugging of complex systems.

BACKGROUND

Well-trained language models-such as large language models (LLMs)—are capable of supporting conversations in natural language, understanding speaker's intent and emotions, explaining complex topics, generating new texts upon receiving suitable prompts, providing advice regarding topics of interest to a user, processing image, audio, and/or other data types, and/or performing other functions. LLMs typically undergo self-supervised training on massive amounts of text data and/or other data types, depending on the embodiment, and learn to predict next and/or missing tokens (which may correspond to sub-words, symbols, words, etc.) in a phrase/sentence, detect intent and/or sentiment of a human speaker, determine if two sentences are related or unrelated, and/or perform other basic language tasks. Following the initial training, LLMs often undergo instructional (prompt-based) supervised fine-tuning that causes LLMs to acquire more in-depth language proficiency and/or master more specialized tasks. Supervised fine-tuning includes using learning prompts (questions, hints, etc.) that are accompanied by example texts (e.g., answers, sample essays, etc.) serving as training ground truth. In reinforcement fine-tuning, a human evaluator assigns grades indicative of a degree to which the generated text resembles human-produced texts.

BRIEF DESCRIPTION OF DRAWINGS

FIG. 5 is a flow diagram of an example method of using language models in assisting users with complex systems installation, troubleshooting, and/or maintenance, according to at least one embodiment;

DETAILED DESCRIPTION

Figure 1:
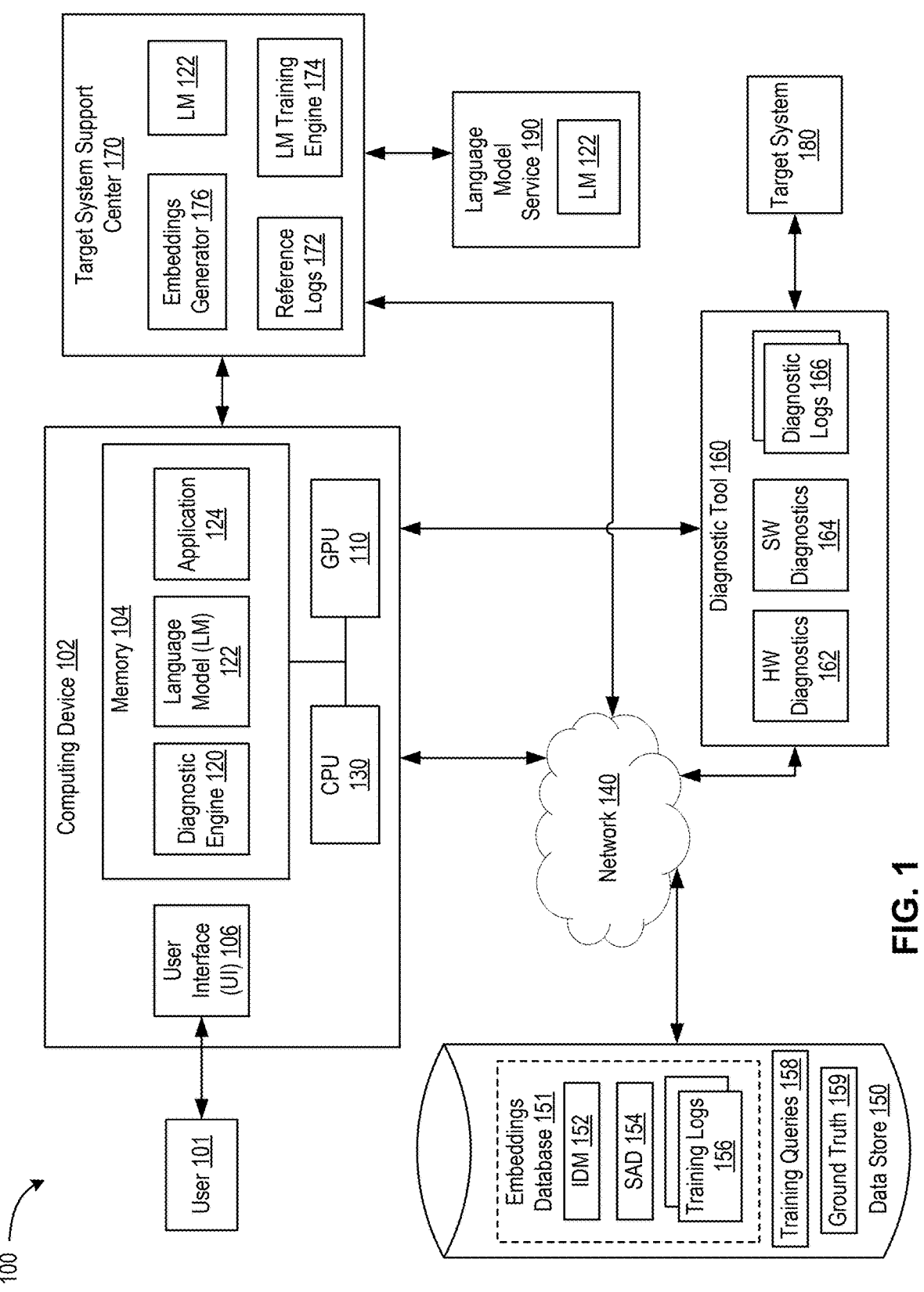
FIG. 1 is a block diagram of an example computer system capable of leveraging language models to aid non-expert users in complex system installation, troubleshooting, and/or maintenance, according to at least one embodiment, according to at least one embodiment.

Complex systems often include a combination of multiple advanced hardware components, software codes or modules, and/or firmware codes or modules. Initial installation, troubleshooting, and debugging of such systems typically require significant efforts, advanced expertise, or both, often greatly exceeding technical knowledge of most users. For example, diagnostics of complex systems can involve the use of sophisticated testing equipment capable of generating hundreds or more of different error/fault indications or codes. Individual error codes can indicate a malfunction of one or more hardware units and/or pieces of software or firmware. A system manual describing such numerous error codes can be voluminous and written in a technical language inaccessible to anyone but experienced engineers or technicians. Likewise, even routine maintenance, updates, and/or replacement of parts of complex systems normally require advanced expert work. This increases the cost of operations of such systems and leads to temporary losses of system availability when such expert help is not immediately available.

Aspects and embodiments of the present disclosure address these and other technological challenges by providing for systems and techniques that leverage capabilities of language models (LMs), including LLMs, to provide real-time guidance, instructions, and recommendations to non-expert users for complex systems installation (including assembly), troubleshooting, and/or maintenance. In some embodiments, a user performing one of such (or similar) operations can describe a problem to an LM in a natural language, e.g., "an ethernet card needs a replacement update" and the LM can respond with instructions how to replace the card and run a diagnostic (e.g., hardware, software, and/or firmware) tool, which can be a part of a system's installation and/or maintenance kit, a built-in tool, and/or the like. The diagnostic tool can perform testing of the system, determine whether the new card is working properly by generating a success code or one or more error codes indicative of a malfunction of the system, e.g., "error 2576—driver conflict" or simply "error 2576." The codes can be provided to the user, e.g., via a suitable user interface such as a general computer display or a dedicated diagnostic tool display. In the instances when one or more error codes are outputted by the diagnostic tool, the user may enter the displayed codes as another prompt into the LM, e.g., "system is showing error 2576." The LM may process the prompt and generate instructions for the user, e.g., "download and run the latest driver update from the system's support center." After the user fulfills the instructions, the user may re-run the diagnostic tool, which may identify any remaining system malfunctions and output additional error codes. The user may use such additional error codes in further prompts into the LM to receive further instructions in plain natural language that would be understood by a non-expert. This process may conclude when the diagnostic tool outputs a success code or any other indication that the system is malfunction-free. In some embodiments, the LM may use a full testing log (or any portion of the testing log) as an additional input, which can be automatically attached to the user's prompt. In some embodiments, the LM may use one or more application programming interfaces or plug-ins to (e.g., recursively) query third party data sources or applications to retrieve (e.g., via retrieval augmentation) additional information or context to help in providing the most accurate, precise, and/or helpful answers to queries or prompts to the LM.

The LM may be trained, e.g., on the support center side, using system-specific documentation, such as an installation and diagnostics manual (IDM) and a system architecture documentation (SAD), third party plug-in and/or API information, among other things. For example, the IDM may be an expert-level manual intended for a system engineer and/or technician and may include technical descriptions of diagnostic error codes (or some other malfunction indicators). The SAD may include description of various hardware blocks and components of the system, software modules, firmware modules, interconnection of the blocks and modules, data flows that occur during operations of the system, mapping of inputs and outputs of the system, mapping of addresses of various blocks, modules, and/or data pathways, and/or the like. The LM may be trained using any additional documentation that is released by system developers or otherwise made available to expert technicians. The LM may also be trained using multiple training diagnostic logs indicative of one or more system malfunctions. Some of the training diagnostic logs can be logs of actual malfunctions encountered during system installation (including assembly), updates, or operations. Some of the training diagnostic logs can be logs generated by the diagnostic tool for the hardware and/or software malfunctions purposely caused by developers to generate training inputs into the LM. Yet some of the training diagnostic logs can be synthetic logs that are generated (simulated) by developers or via random selection of one or more error codes. A ground truth used for training of the LM may include sample responses to user prompts prepared by system developers (e.g., in the instances of supervised LM training), which the LM attempts to emulate, with a suitable loss function evaluating the difference between LM's training responses and the sample (ground truth) responses. In some instances, the LM-generated training responses may be evaluated (e.g., by a developer, expert technician, or a layperson user) on any suitable scale (e.g., 1 through N) indicative of helpfulness or effectiveness of the training responses (in the instances of reinforcement learning). In yet other instances, a training engine that performs LM training may access database of historical user queries and respective expert responses (which may have been provided over phone, chat, and/or some other recorded customer service modality) and then use such queries/response for unsupervised training of the LM.

The advantages of the disclosed techniques include but are not limited to provisioning of timely and efficient technical support to non-expert users of complex systems during initial installation, troubleshooting, and/or maintenance of such systems. This enables users to perform system servicing in many instances directly whenever such servicing is required without the need to wait for the expert help. This reduces the costs of system operations and the amount of time when such systems remain offline once a malfunction or maintenance issue occurs. Additionally, the techniques disclosed herein may allow low-sophistication repair facilities to provide higher-level technical support than would otherwise be possible and to minimize the number of referrals to system engineers for high-qualification and/or onsite assistance.

FIG. 1 is a block diagram of an example computer system 100 capable of leveraging language models to aid non-expert users in complex system installation, troubleshooting, and/or maintenance, according to at least one embodiment. As depicted in FIG. 1, computer system 100 may include a computing device 102, a data store 150, and a target system support center 170 connected to a network 140. Network 140 may be a public network (e.g., the Internet), a private network (e.g., a local area network (LAN), or wide area network (WAN)), a wireless network, a personal area network (PAN), a combination thereof, and/or another network type. Computing device 102 may be communicatively coupled (e.g., via network 140 or a local connection) to a diagnostic tool 160 that performs diagnostics of any suitable target system 180.

Target system 180 can include any computing equipment, manufacturing equipment, industrial equipment, automotive equipment, home equipment, entertainment equipment, and/or any other system or a combination of multiple systems. For example, target system 180 may include a network server supporting operations of a local computing network. In another example, target system 180 may include an automotive entertainment system of a vehicle. In yet another example, target system 180 may include an industrial robotic system. Target system 180 may include any combination of hardware components, e.g., processing devices, memory devices, peripheral devices, network controllers, instrumentation components, robotic equipment components, engines, actuators, mechanical devices, electronic circuits, displays, lidars, radars, cameras, lighting devices, audio devices, video devices, and/or any other hardware equipment. Target system 180 may further include any combination of software codes, modules, routines, drivers, application programming interfaces (APIs), and/or any other software programs, scripts, instructions, and/or the like that are executed thereon, in association with, or to facilitate operations of the hardware devices.

Diagnostic tool 160 may be any device or a combination of multiple devices designed, assembled, and/or configured to test, troubleshoot, identify malfunctions, confirm adherence to specifications of target system 180 and/or otherwise facilitate operations of target system 180. Diagnostic tool 160 may be of any level of sophistication, e.g., ranging from a tool capable of performing a single type of measurement to an intricate diagnostic machine whose complexity may significantly exceed a complexity of target system 180 itself. In some embodiments, diagnostic tool 160 may include hardware diagnostics 162 capable of testing one, multiple, or all hardware components of target system 180. For example, hardware diagnostics 162 may use any number of sensors capable of measuring any relevant environmental conditions (e.g., temperature, pressure, etc.) and any number of metrics associated with performance of target system 180, such as speed and accuracy of operations of target system 180, network (e.g., Ethernet and/or wireless network) bandwidth, processor speed/utilization, available disk space, energy usage, memory/disk health status, signal strength, signal range, signal quality, response delays, fan speeds, voltages, load and clock speeds, and/or the like. Software diagnostics 164 may use any number of test programs/scripts sensors capable of measuring effectiveness of software execution on testing system 180, e.g., time in queue, network throughput, bit error rate, latency, memory usage, processor speed/utilization, and/or the like. It should be understood that in some instances, hardware diagnostics 162 and software diagnostics 164 may not have clear delineation so that a particular diagnostics component may have both hardware diagnostic functionality and software diagnostic functionality. For example, a network latency/throughput/bit error diagnostics may be a combination of hardware and software testing tools.

Diagnostic tool 160 may apply hardware diagnostics 162 and software diagnostics 164 to target system 180 and generate one or more diagnostic logs 166 that represent records, made in any suitable format, of one or more performed diagnostic operations. In one example, a diagnostic log 164 may include a list of operations, individual operations indexed by respective operation identifications (IDs), and outcomes of the operations. Some operations may include binary outcomes (e.g., "check: pass" or "check: fail") while other operations may have multivalued (e.g., continuous) outcomes (e.g., network latency "83 ms"). Some operations may include discrete error/fault malfunction indicators (e.g., codes/faults), each error or fault indicative of a particular type of a malfunction of target system 180 A number of operations performed by hardware diagnostics 162 and/or software diagnostics 164 and documented in diagnostic logs 166 is not limited and may range from a single operation (for relatively simple target systems 180) to hundreds, thousands, or even more operations. Similarly, individual diagnostic operations may have any number—two or more—of faults, errors, and/or continuous values.

In some embodiments, diagnostic tool 160 may be integrated into target system 180. In some embodiments, diagnostic tool 160 may be separate from target system 180 and may engage (e.g., couple through one or more interfaces) target system 180 responsive to an occurrence of a malfunction, a periodic or one-time update, replacement of a worn-out component, and/or the like. In some embodiments, diagnostic tool 160 may be launched by a user 101, e.g., responsive to a user instruction received by computing device 102 via a user interface (UI) 106 (e.g., following detection of a malfunction by user 101 or other users). In some embodiments, diagnostic tool 160 may be launched automatically by computing device 102, e.g., responsive to a time of periodic maintenance. Computing device 102 may include a desktop computer, a laptop computer, a smartphone, a tablet computer, a server, a wearable device, a virtual/augmented/mixed reality headset or head-up display, a digital avatar or chatbot kiosk, an in-vehicle infotainment computing device, and/or any suitable computing device capable of performing the techniques described herein. Computing device 102 may be configured to communicate with user 101 via UI 106. User 101 may be an individual user (e.g., an owner of a computer, vehicle, entertainment equipment), a collective user (e.g., a business organization, an institution, a government agency, and/or the like), an agent of a repair facility, and/or the like. In some embodiments, queries (questions) generated by user 101 may include a text (e.g., a sequence of one or more typed words), a speech (e.g., a sequence of one or more spoken words), or an image (e.g., an image of an output of target system 180 indicative of a malfunction), and/or some combination thereof. The queries may be generated as part of interaction of user 101 with a diagnostic engine 120 that interfaces to and facilitates communications with an LM 122 and, in some embodiments, may communicate with diagnostic tool

160. In some embodiments, LM 122 may be an LLM, e.g., a model with hundreds of millions or one or more billions of learned parameters.

UI 106 may include one or more devices of various modalities, e.g., a keyboard, a touchscreen, a touchpad, a writing pad, a graphical interface, a mouse, a stylus, and/or any other pointing device capable of selecting words/phrases that are displayed on a screen, and/or some other suitable device. In some embodiments, UI 106 may include an audio device, e.g., a combination of a microphone and a speaker, a video device, such as a digital camera to capture an image or a sequence of two or more images (video frames). In some embodiments, text, speech, and/or video input devices may be integrated together (e.g., into a smartphone, tablet computer, desktop computer, and/or the like).

Computing device 102 may include a memory 104 (e.g., one or more memory devices or units) communicatively coupled to one or more processing devices, such as one or more graphics processing units (GPU) 110, one or more central processing units (CPU) 130, one or more data processing units (DPU), one or more parallel processing units (PPUs), and/or other processing devices (e.g., field-programmable gate arrays (FPGAs), application-specific integrated circuits (ASICs), and/or the like). Memory 104 may include a read-only memory (ROM), a flash memory, a dynamic random-access memory (DRAM), such as synchronous DRAM (SDRAM), a static memory, such as static random-access memory (SRAM), and/or some other memory capable of storing digital data. Memory 104 may store diagnostic engine 120 and LM 122, and an application 124. Application 124 may be or include any application that runs on, deploys, or otherwise uses target system 180.

In some embodiments, LM 122 may be a model that is trained and deployed by a separate entity, e.g., LM service 190, which may be a cloud service, a subscription service, and/or some combination thereof. In some embodiments, LM 122 may be trained in multiple stages. Initially, LM service 190 may train LM 122 to capture syntax and semantics of human language, e.g., by predicting a next, a previous, and/or a missing word in a sequence of words (e.g., one or more sentences of a human speech or text). LM 122 may be further trained using training data containing a large number of texts, such as human dialogues, newspaper texts, magazine texts, book texts, web-based texts, and/or any other texts. Since ground truth for such training is embedded in the texts themselves, LM service 190 may use such texts for self-supervised training of LM 122. This teaches LM 122 how to carry out a conversation with a user (a human user or another computer) in a natural language in a manner that closely resembles a dialogue with a human speaker, including understanding the user's intent and responding in ways that the user expects from a conversational partner.

Following the initial self-supervised training, an LM training engine 174 (e.g., deployed by target system support center 170) may implement a supervised fine-tuning of LM 122 to teach LM 122 specifics of target system 180. In particular, LM 122 may be trained using system-specific documentation, e.g., installation and diagnostics manual (IDM) 152, system architecture documentation (SAD) 154, and training logs 156. IDM 152 may include, among other information, technical descriptions of diagnostic error codes. IDM 152 may be written to be understood by an expert technician or engineer rather than a user of target system 180. SAD 154 may include addresses, descriptions, and connections of hardware components and software modules of target system 180, and/or other architectural information, such as data pathways. SAD may further include a list of tests available via diagnostic tool 160 and a mapping of various hardware components and software modules to the listed tests, e.g., a description of components/ modules tested by individual tests. Training logs 156 may include logs of actual malfunctions encountered during operations of one or more historical instances of target system 180, malfunctions purposely caused by developer(s) (specifically to generate training data for LM 122), synthetic logs that are generated (simulated) by developer(s) or via random selection of one or more error codes, and/or error logs generated by any other suitable techniques. LM training engine 174 may use training queries 158, which may be natural language inquiries related to training logs 156 (e.g., "diagnostic tool shows error code 8250"), likely to be asked by a user who seeks technical assistance. Training queries 158 may be used to form training prompts that are inputted into LM 122. Training prompts may further include IDM 152 and/or SAD 154 and instruction(s) to LM 122 that the explanations about error codes in training queries 158 and various additional information that may be relevant to training queries 158 can be found in those (IDM 152 and/or SAD 154) documents. During training, LM 122 may generate a (training) response to the training query 158, the response including one or more instructions to the user about how to resolve the malfunction referenced in the user's query. Training queries 158 may be mapped on ground truth 159, which may include sample responses to training queries 158, e.g., as prepared by system developers. The LM-generated training responses may be evaluated (e.g., by a developer, an expert technician, or a layperson user) using a suitable loss function or using some evaluation scale indicative of effectiveness of the training responses. LM training engine 174 may additionally use reference logs 172—e.g., diagnostic logs corresponding to malfunction-free state of target system 180—to teach LM 122 how to identify a desirable (target) state of the system.

In some embodiments, any, some, or all of IDM 152, SAD 154, training logs 156, training queries 158, and ground truth 159 may be stored in data store 150 accessible to target system support center 170 directly (e.g., via a bus, interconnect, and/or the like) or (as shown in FIG. 1) via network 140. Data store 150 may include a persistent storage and may be hosted by one or more storage devices, such as main memory, magnetic or optical storage disks, tapes, or hard drives, network-attached storage (NAS), storage area network (SAN), and so forth. Although depicted as separate from target system support center 170 and/or computing device 102, in at least some embodiments, data store 150 may be a part of target system support center 170 and/or computing device 102. In at least some embodiments, data store 150 may be a network-attached file server, while in other embodiments data store 150 may be some other type of persistent storage, such as an object-oriented database, a relational database, and so forth, that may be hosted by target system support center 170 and/or computing device 102 or one or more different machines coupled to target system support center 170 and/or computing device 102 via network 140.

In some embodiments, any, some, or all of IDM 152, SAD 154, and training logs 156 may be stored as sets of embeddings (vectors in a suitable embedding space) in embedding database 151. An embedding should be understood as any suitable digital representation of an input data, e.g., as a vector (string) of any number m of components, which can have integer values or floating-point values. Embeddings may be considered as points in an m-dimensional embedding space. The dimensionality m of the embedding space can be smaller than the size of the input data. During training, an embeddings generator 176 learns to associate similar sets of the input data with similar embeddings represented by points closely situated in the embedding space and further learns to associate dissimilar sets of the input data with points that are located farther apart in that space.

In some embodiments, target system support center 170 may train multiple LMs 122 for multiple types of target systems 170. In some embodiments, any given LM 122 trained by target system support center 170 may be capable of facilitating maintenance and debugging of multiple types of target systems, e.g., being trained with multiple sets of training data, such as target system-specific IDM 152, SAD 154, training logs 156, training queries 158, and/or ground truth 159.

LM 122 may be implemented using neural networks with a large number (e.g., billions) of artificial neurons. In at least one embodiment, LM 122, and/or other deployed models, may be implemented as deep learning neural networks having multiple levels of linear and non-linear operations. For example, LM 122 may include convolutional neural networks, recurrent neural networks, fully-connected neural networks, long short-term memory (LSTM) neural networks, neural networks with attention, e.g., transformer neural networks, a combination of a convolutional network and one or more transformers (a conformer), and/or neural networks of other types. In at least one embodiment, LM 122 may include multiple neurons, with an individual neuron receiving its input from other neurons and/or from an external source and producing an output by applying an activation function to the sum of weighted (using trainable weights) inputs and, possibly, a bias value. In at least one embodiment, LM 122 may include multiple neurons arranged in layers, including an input layer, one or more hidden layers, and/or an output layer. Neurons from adjacent layers may be connected by weighted edges.

Initially, parameters (e.g., edge weights and biases) of LM(s) 122 may be assigned some starting (e.g., random) values. For various training inputs, LM training engine 174 may cause LM(s) 122 to generate training output(s). LM training engine 174 may then compare training output(s) with the desired target output(s). The resulting error or mismatch, e.g., the difference between the target output(s) and the training output(s), may be backpropagated through various neural layers of LM(s) 122, and the weights and biases of LM(s) 122 may be adjusted to make the training outputs closer to the target (ground truth) outputs. This adjustment may be repeated until the output error for a given training input satisfies a predetermined condition (e.g., falls below a predetermined value). Subsequently, a different training input may be selected, a new training output generated, and a new series of adjustments implemented, until LM(s) 122 is trained to a target degree of accuracy or until LM(s) 122 converges to a limit of its architecture-determined accuracy.

The trained LM 122 may be located on target system support center 170 or on LM server 190. In one embodiment, target system support center 170 or LM server 190 may be implemented on a single computing device. Target system support center 170 or on LM server 190 may be (and/or include) a rackmount server, a router computer, a personal computer, a laptop computer, a tablet computer, a desktop computer, a media center, or any combination thereof.

Figure 2:
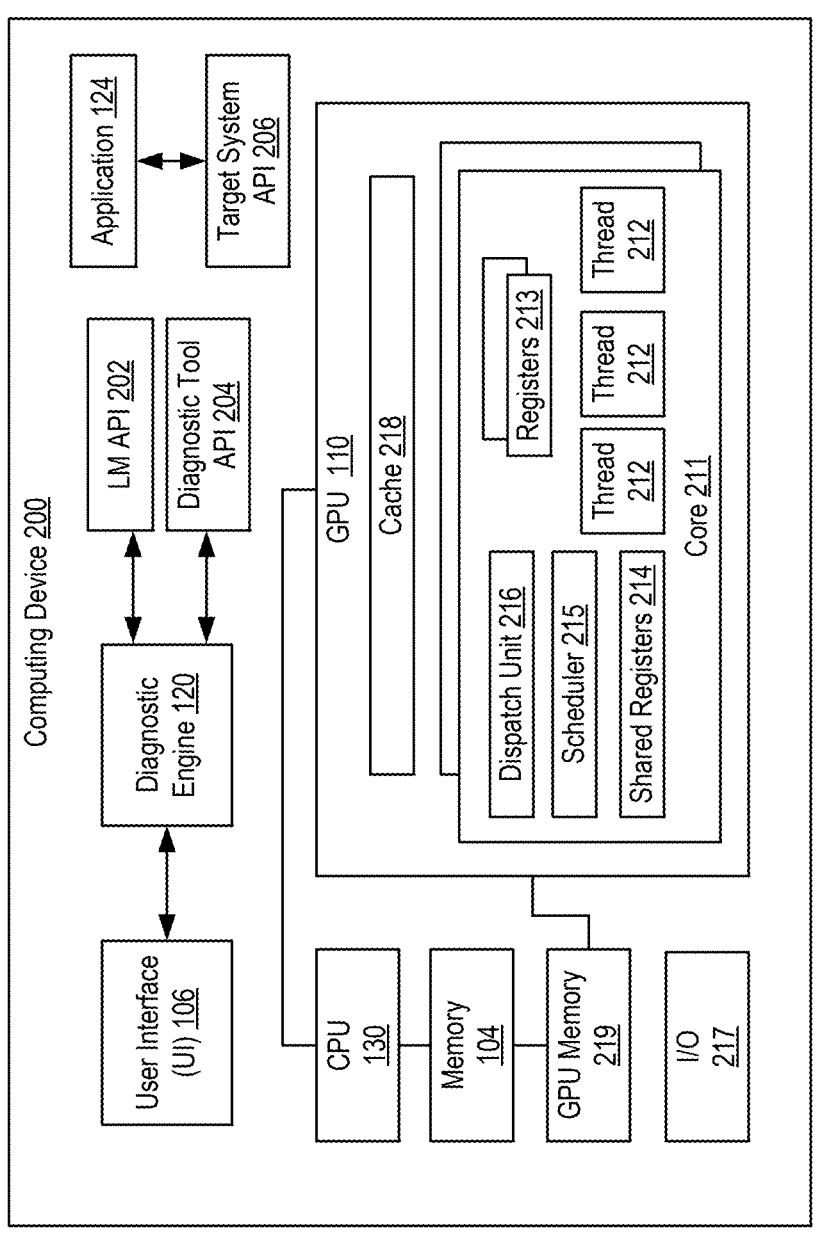
FIG. 2 illustrates an example computing device that supports deployment of language models to assist users in complex systems installation, troubleshooting, and/or maintenance.

FIG. 2 illustrates an example computing device 200 that supports deployment of language models to assist users in complex systems installation, troubleshooting, and/or maintenance, according to at least one embodiment. In at least one embodiment, computing device 200 may be a part of computing device 102. In at least one embodiment, computing device 200 may include diagnostic engine 120 that obtains user queries from UI 106 and provides responses generated by a LM, via UI 106, to the user. Diagnostic engine 120 may communicate with the LM via an LM application programming interface (API) 202. In some embodiments, the LM may be located on a different computing device/server, e.g., on a cloud-based server of LM service 190 (with reference to FIG. 1). LM API 202 may be downloaded from LM service 190 (or target system support center 170) and installed on computing device 102 to facilitate communication with LM 122, which is remotely provided by LM service 190 or target system support center 170. Computing device 200 may further include a diagnostic tool API 204 that supports communications with diagnostic tool 160, including (but not limited to) sending requests to diagnostic tool 160 to perform one or more specific tests, receiving diagnostic logs 166, and/or the like. Computing device 200 may also support any suitable application 124 that runs on, or in associations with, target system 180 (with reference to FIG. 1), e.g., a control software for a product manufacturing line, a camera software for a digital camera, and/or the like. Application 124 may communicate with target system 180 via any suitable target system API 206.

Operations of diagnostic engine 120, application 124, LM API 202, diagnostic tool API 204, target system API 206, and/or other software/firmware operating on computing device 200 may be executed using one or more GPUs 110, one or more CPUs 130, one or more parallel processing units (PPUs) or accelerators, such as a deep learning accelerator, data processing units (DPUs), and/or the like. In at least one embodiment, a GPU 110 includes multiple cores 211, each core being capable of executing multiple threads 212. Each core may run multiple threads 212 concurrently (e.g., in parallel). In at least one embodiment, threads 212 may have access to registers 213. Registers 213 may be thread-specific registers with access to a register restricted to a respective thread. Additionally, shared registers 214 may be accessed by one or more (e.g., all) threads of the core. In at least one embodiment, each core 211 may include a scheduler 215 to distribute computational tasks and processes among different threads 212 of core 211. A dispatch unit 216 may implement scheduled tasks on appropriate threads using correct private registers 213 and shared registers 214. Computing device 200 may include input/output component(s) 217 to facilitate exchange of information with one or more users or developers.

In at least one embodiment, GPU 110 may have a (high-speed) cache 218, access to which may be shared by multiple cores 211. Furthermore, computing device 200 may include a GPU memory 219 where GPU 110 may store intermediate and/or final results (outputs) of various computations performed by GPU 110. After completion of a particular task, GPU 110 (or CPU 130) may move the output to (main) memory 104. In at least one embodiment, CPU 130 may execute processes that involve serial computational tasks whereas GPU 110 may execute tasks (such as multiplication of inputs of a neural node by weights and adding biases) that are amenable to parallel processing.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems for generating or presenting at least one of augmented reality content, virtual reality content, mixed reality content, systems incorporating one or more virtual machines (VMs), systems for performing synthetic data generation operations, systems implemented at least partially in a data center, systems for performing generative AI operations, systems for performing conversational AI operations, systems for performing light transport simulation, systems for performing collaborative content creation for 3D assets, systems implementing one or more language models, such as large language models (LLMs) (which may process text, voice, image, and/or other data types to generate outputs in one or more formats), systems implemented at least partially using cloud computing resources, and/or other types of systems.

Figure 3:
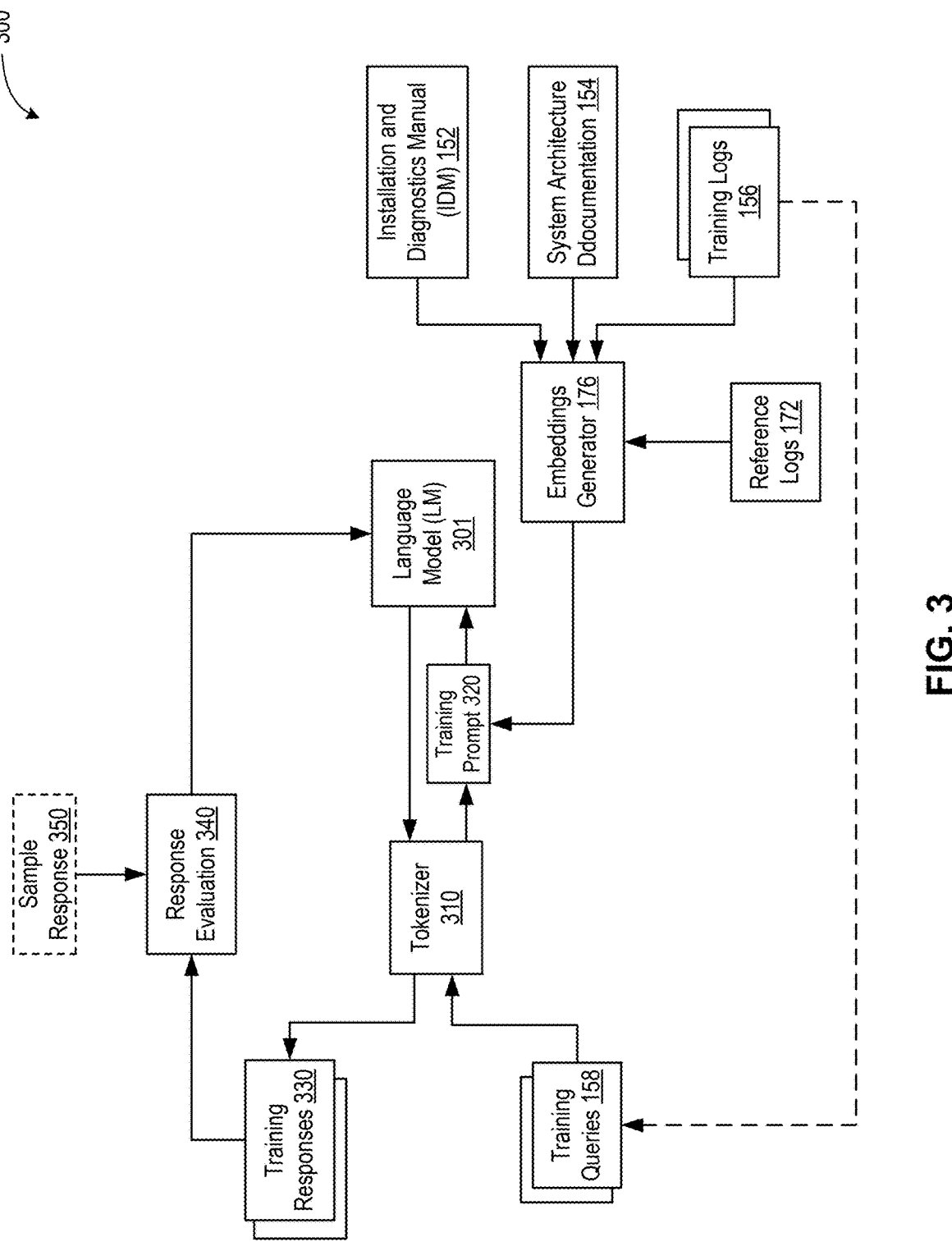
FIG. 3 illustrates example training of a language model to assist users with complex systems installation, troubleshooting, and/or maintenance, according to at least one embodiment.

FIG. 3 illustrates example training 300 of a language model to assist users with complex systems installation, troubleshooting, and/or maintenance, according to at least one embodiment. In at least one embodiment, LM training engine 174 (of FIG. 1) may train LM 301. LM 301 may be initially trained (pretrained) in various general tasks of natural language processing by LM service 190, including but not limited to predicting a next, a previous, and/or a missing word in a sentence (or some other sequence of words) encountered in any suitable corpus of texts. The pretrained LM 301 may be capable to converse with a human user in a natural language.

Training 300 may include supervised training, self-supervised training, reinforcement training, unsupervised training, or any combination thereof. Training 300 may be used to train LM 301 to provide installation, troubleshooting, maintenance, and/or any other technical support for operations of any suitable system, e.g., target system 180 in FIG. 1. Training 300 may use various documentation associated with the target system, including but not limited to some or all of installation and diagnostics manual 152, system architecture documentation 154, training logs 156, and reference logs 172.

In some embodiments, a training log 156 may be selected for a given instance (epoch) of training 300. Trailing log 156 may be associated with a historical malfunction encountered during previous operations of target system 180, an intentionally caused malfunction, a synthetic log generated by a developer(s), a log that includes a random selection of one or more error codes, etc. As indicated with the dashed arrow in FIG. 3, a training query 158 may be generated for the selected training log 156. Training query 158 may reflect a likely reaction of a non-specialist user to training log 156 and may be generated by a developer, an engineer, or a non-specialist user. Training query 158 may be formulated in a natural language that a potential user is likely to type or utter. For example, training query 158 may include a question about the meaning of the error code(s) in training log 156, a request for help, a call for step-by step guidance about how to resolve the error code, and/or the like.

Tokenizer 310 may transform training queries 158 into tokens recognizable by LM 301. A set of tokens may be specific to LM 301 (e.g., may be different for different models and/or model creators) and fixed during pretraining of LM 301. The set of tokens may include any suitable representation of units of speech (e.g., syllables, words, etc.) as numbers. In one example of GPT-4 tokens, word "the" may be represented via token "280", word "import" may be represented via token "476," word "description" may be represented via token "4097," and so on. In some embodiments, individual words may be represented via any number of tokens or word transitions. For example, a long word or a word that contains multiple words may be represented via multiple tokens, e.g., with one token used to represent a beginning portion of the word and another token(s) representing a middle or end portion of the word. In some instances, even a long/composite word may be represented by a single token. As such, the tokenization may be performed in any manner that is suitable for inputs into LM 301.

Training queries 158 may be used to form training prompts 320 that are inputted into LM 301. Training prompts 320 may further include (but need not be limited to) any, some, or all of the target system's documentation, e.g., IDM 152, SAD 154, training logs 156, and/or reference logs 172 (logs of a properly functioning target system). Various portions of the system's documentation may be converted into embeddings using embeddings generator 176 before being used in the training prompts 320.

LM 301 may generate a training response 330 to the training query 158. Training response 330 may include instructions to the user with a guidance regarding resolution of the malfunction referenced in training query 158. Training response 330 may undergo response evaluation 340 to determine a degree of suitability/effectiveness of training response 330 for resolution of the malfunction. In some embodiments, response evaluation 340 may be performed by a developer, expert technician, non-specialist user, etc. For example, if a sample response 350 (e.g., prepared by an expert) is available, a loss function may be used to evaluate a difference between training response 330 and sample response 350. This difference may be used to adjust LM 301, e.g., by directly changing parameters of LM 301 (using techniques of backpropagation, gradient descent, and/or the like), by revealing sample response 350 to LM 301, and/or using various other learning techniques. In those instances where sample response 350 is not available, response evaluation 340 may grade training response 330 using a suitable evaluation scheme, e.g., 1–N, and provide the evaluation grade to LM 301. Having received the evaluation grade, LM 301 may generate a new (updated) training response 330, which may be similarly evaluated. This process may continue until an acceptable training response 330 is generated. Training of LM 301 may be performed using multiple training queries 158 associated with training logs 156 that have a variety of error codes (or other malfunction indicators) that may be encountered during the target's system installation, operations, troubleshooting, and/or maintenance.

When a target system undergoes an update (a hardware update, a software update, a firmware update, a combination thereof, etc.) or a modification that changes IDM 152 (e.g., new tests are added to diagnostic tool 160), of SAD 154 (e.g., new hardware components and/or software modules are added to target system 180), the language model (e.g., LM 301) can be retrained using additional training data. In some embodiments, retraining may be limited to the new features/tests/etc., e.g., with additional training logs 156 characterizing malfunctions of the added features and/or using new tests added to diagnostic tool 160 and training queries 158 with questions about malfunctions of the added features and/or errors associated with the new tests. After retraining, the language model may be made available for field use, e.g., as described in conjunction with FIG. 4 below.

Figure 4:
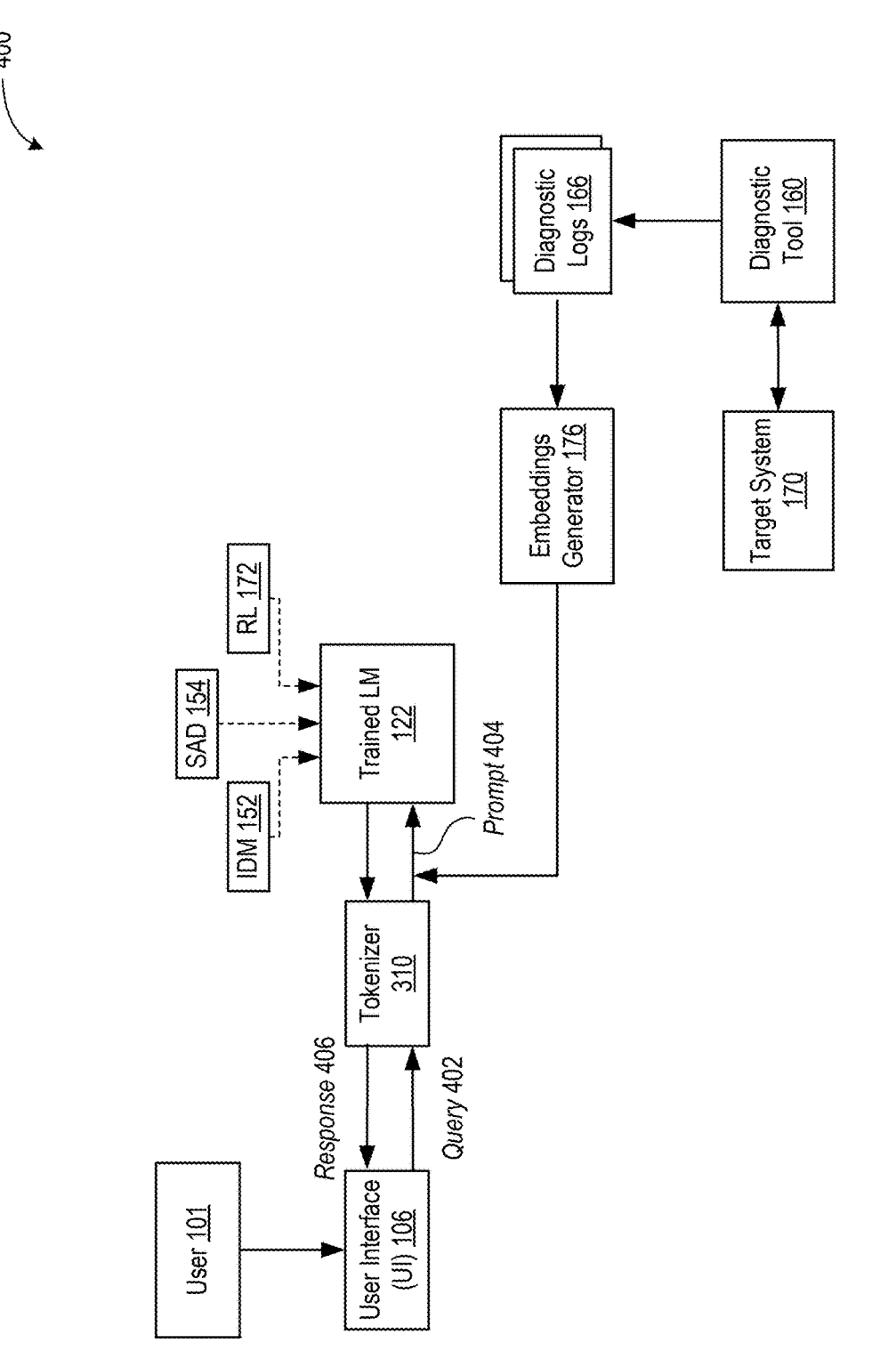
FIG. 4 illustrates an example use of a trained language model in assisting users with complex systems installation, troubleshooting, and/or maintenance, according to at least one embodiment.

FIG. 4 illustrates an example use 400 of a trained language model in assisting users with complex systems installation, troubleshooting, and/or maintenance, according to at least one embodiment. The use 400 may be implemented by an individual user, an organization user, a repair facility, or any other entity that may be tasked with a system's assembly, operations, and/or upkeep. LM 122 deployed in the use 400 may be LM 301 trained using example training 300 of FIG. 3. As disclosed in conjunction with FIG. 3, during training, LM 122 may learn various system-specific documentation, e.g., IDM 152, SAD 154, reference logs (RL) 172, and/or any additional knowledge of target system 180.

As illustrated in FIG. 4, diagnostic tool 160 may run diagnostics of target system 180 to generate one or more diagnostic logs 166. The diagnostics may be performed responsive to a malfunction of target system 180, a hardware and/or a software update of target system 180, a scheduled (e.g., periodic) maintenance to be performed on target system 180, or for any other reason. Diagnostic log(s) 166 may be provided to user 101. Having received diagnostic log(s) 166, user 101 may submit, via UI 106, a query 402 to LM 122. Query 402 may be formulated in a natural language and may include a question about the meaning of the error code(s) in diagnostic log(s) 166, a request for help, a call for a guidance in resolution of the error code(s), and/or the like (e.g., "PCIe port is not working," "camera is not found," etc.).

Tokenizer 310 may transform query 402 into tokens recognized by LM 122. Query 402 may be used to form a prompt 404 that is inputted into LM 122. Prompt 404 may include diagnostic log(s) 166 (or any porting of the logs), which may be converted into one or more embeddings using embeddings generator 176. LM 122 may generate a response 406 to prompt 404. Response 406 may include instructions to the user with guidance regarding resolution of the malfunction referenced in query 402, instructions how to perform an update, maintenance, and/or any other operations associated with target system 180.

User 101 may cause an action to be performed on target system 180, e.g., a replacement of a component of target system 180, installation or reinstallation of a software, and/or the like. Subsequently, diagnostic tool 160 may perform additional diagnostics on target system 170 and may generate additional diagnostic logs. If a "no fault" signal is present in the logs, the troubleshooting process may conclude. If additional errors/faults are present in the logs, user 101 may enter a new query and the above-described process may continue in as many cycles as may be needed to resolve the remaining malfunctions.

In some embodiments, the LM may communicate back and forth with one or more (e.g., third party) plug-ins or APIs in order to facilitate the communication with the user. For example, where a specific error code is present, the LM may use a third-party plug-in associated with the error code to retrieve information about the nature of the error code as well as any underlying troubleshooting steps or processes, and may generate an output to the user using this additional information. This process may be repeated for any number of plug-ins and/or APIs until the communication with the user is completed.

Figure 6:
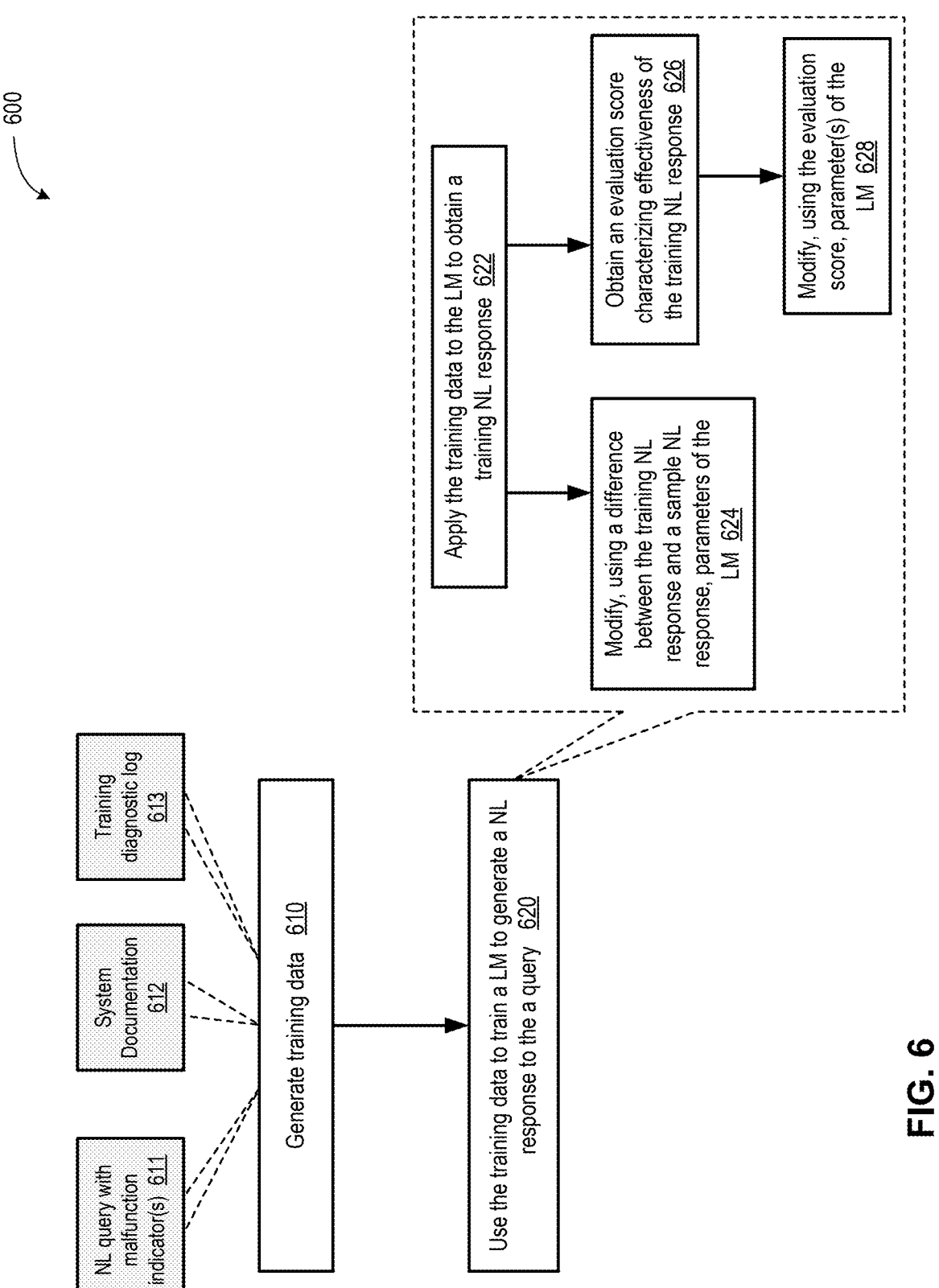
FIG. 6 is a flow diagram of an example method of training language models to assist users with complex systems installation, troubleshooting, and/or maintenance, according to at least one embodiment.

FIGS. 5 and 6 illustrate example methods 500 and 600 directed to training and use of trained language models in assisting users with complex systems installation, troubleshooting, and/or maintenance. Methods 500 and 600 may be used in the context of provisioning of technical support to users and/or maintenance personnel of any complex system. A system can be regarded as complex if its installation, troubleshooting, and/or maintenance involves specialized knowledge whose acquisition requires time, effort, and/or experience beyond what a typical user/maintenance person is expected to have. The system can be a hardware system, a software/firmware system, and/or a system deploying a combination of hardware and software/firmware. In at least one embodiment, methods 500 and/or 600 may be performed using processing units of computing device 102 and/or target system support center 170 of FIG. 1. In at least one embodiment, processing units performing methods 500 and/or 600 may be executing instructions stored on a non-transient computer-readable storage media. In at least one embodiment, methods 500 and/or 600 may be performed using multiple processing threads (e.g., CPU threads and/or GPU threads), with individual threads executing one or more individual functions, routines, subroutines, or operations of the methods. In at least one embodiment, processing threads implementing any of methods 500 and/or 600 may be synchronized (e.g., using semaphores, critical sections, and/or other thread synchronization mechanisms). Alternatively, processing threads implementing any of methods 500 and/or 600 may be executed asynchronously with respect to each other. Various operations of any of methods 500 and/or 600 may be performed in a different order compared with the order shown in FIGS. 5 and 6. Some operations of any of methods 500 and/or 600 may be performed concurrently with other operations. In at least one embodiment, one or more operations shown in FIGS. 5 and 6 may not always be performed.

FIG. 5 is a flow diagram of an example method 500 of using language models in assisting users with complex systems installation, troubleshooting, and/or maintenance, according to at least one embodiment. Method 500 may be performed using one or more processing units (e.g., CPUs, GPUs, accelerators, PPUs, DPUs, etc.) of computing device 102, the processing units including (or communicating with) one or more memory devices.

At block 510, method 600 may include receiving, via a user interface (UI), a natural language (NL) query associated with one or more malfunction indicators indicative of a malfunction state of a system. The malfunction indicators may include error/fault codes (e.g., numerical or letter codes), description of the malfunction state (e.g., using natural language or any predetermined set of descriptors), and/or using other indicators capable of identifying one or more malfunctions of the system. In some embodiments, the one or more malfunction indicators are received from a diagnostic tool in association with system diagnostics 501 performed for the system. The NL query can include a text prompt, a speech prompt, an audio prompt, an image prompt, and/or the like, or any combination thereof. For example, a user may type a text using a keyboard, utter speech using a microphone, or via some other action. In some embodiments, the NL query is generated responsive to a scheduled maintenance of the system, a hardware update of the system, a software update of the system, an inoperable condition of the system, and/or the like, or some combination thereof.

At block 520, method 500 may include providing an input to an LM. In some embodiments, the LM may include a large language model. The input can include a prompt that is based at least on the NL query. The input into the LM may also include one or more test logs associated with the performed diagnostics of the system. In some embodiments, the LM communicates with at least one of an API or a plug-in to retrieve additional information related to the NL query. In some embodiments, the LM can be trained using a documentation associated with the system. For example, the documentation used in training may include a diagnostic documentation for the system (e.g., installation, assembly, maintenance manual, and/or the like). The documentation used in training may further include a system architecture documentation for the system. The documentation used in training may further include one or more training diagnostic logs associated with historical or simulated malfunctions of the system.

At block 530, method 500 may include receiving, from the LM, a response to the NL query. The response may include one or more instructions associated with resolution of the malfunction state of the system. At block 540, method 500 may continue with causing the UI to display the response. As indicated with the dashed arrows in FIG. 5, operations of blocks 501-540 may be repeated until the malfunction state is resolved (block 550).

In one example, where two or more iterations of method 500 are used, during initial (first) iteration, an initial input (that is based at least on an initial NL query) may be provided to the LM, and an initial response (having one or more initial instructions) to the initial NL query may be received from the LM. Following an initial attempt (e.g., one or more initial actions) by the user that fails to resolve the malfunction, a new system diagnostics 501 may be performed yielding malfunction indicator(s) that reflect the initial attempt to resolve the malfunction state of the system. These malfunction indicator(s) may then be used to formulate a subsequent NL query (e.g., for the second iteration of method 500).

FIG. 6 is a flow diagram of an example method 600 of training language models to assist users with complex systems installation, troubleshooting, and/or maintenance, according to at least one embodiment. Method 600 may be performed using one or more processing units (e.g., CPUs, GPUs, accelerators, PPUs, DPUs, etc.) of target system support center 170 of FIG. 1, which may include (or communicate with) one or more memory devices.

At block 610, method 600 may include generating training data. The training data may include a natural language (NL) query (611) associated with one or more malfunction indicators indicative of a malfunction state of a system. The training data may further include a documentation (612) associated with the system. The training data may further include a training diagnostic log(s) (613) associated with the malfunction state of the system. In some embodiments, the documentation associated with the system may include a diagnostic documentation for the system and/or a system architecture documentation for the system. In some embodiments, the training diagnostic log may include a diagnostic log associated with performed diagnostics of the system, a synthetic diagnostic log for the malfunction state of the system, and/or both.

At block 620, method 600 may continue with using the training data to train an LM (e.g., a neural network-based large language model) to generate a NL response to the NL query. The NL response may include one or more instructions associated with resolution of the malfunction state of the system. In some embodiments, using the training data to train the LM may include operations illustrated with the callout portion of FIG. 6. More specifically, at block 622, method 600 may include applying the training data to the LM to obtain a training NL response. In those embodiments, where the training data includes a sample NL response to the NL query, method 600 may include, at block 624 identifying a difference between the training NL response and the sample NL response and causing, using the identified difference, one or more parameters of the LM to be modified. In some embodiments, training the LM model may include, as illustrated with block 626, obtaining an evaluation score characterizing effectiveness of the training NL response for resolution of the malfunction state of the system. For example, the evaluation score can be generated by a human (e.g., an expert or non-expert developer). At block 628, method 600 may include causing, using the evaluation score, one or more parameters of the LM to be modified, e.g., by informing the LM of the evaluation score, prompting the LM to generate additional responses (to be similarly evaluated), and/or the like.

The systems and methods described herein may be used for a variety of purposes, by way of example and without limitation, for performing one or more operations with respect to machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

Inference and Training Logic

Figure 7A:
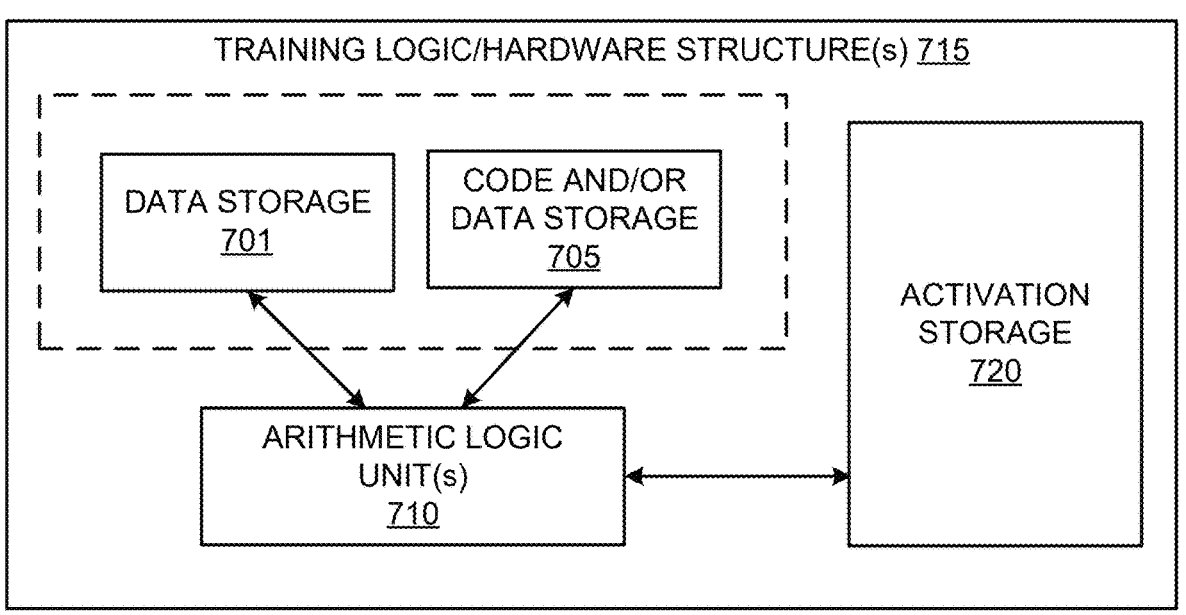
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
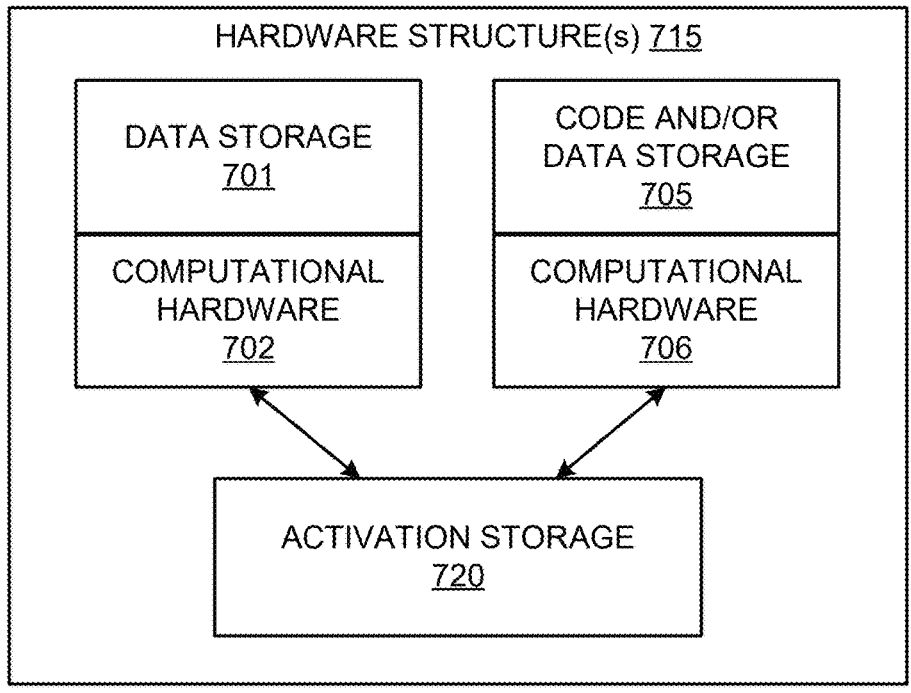
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
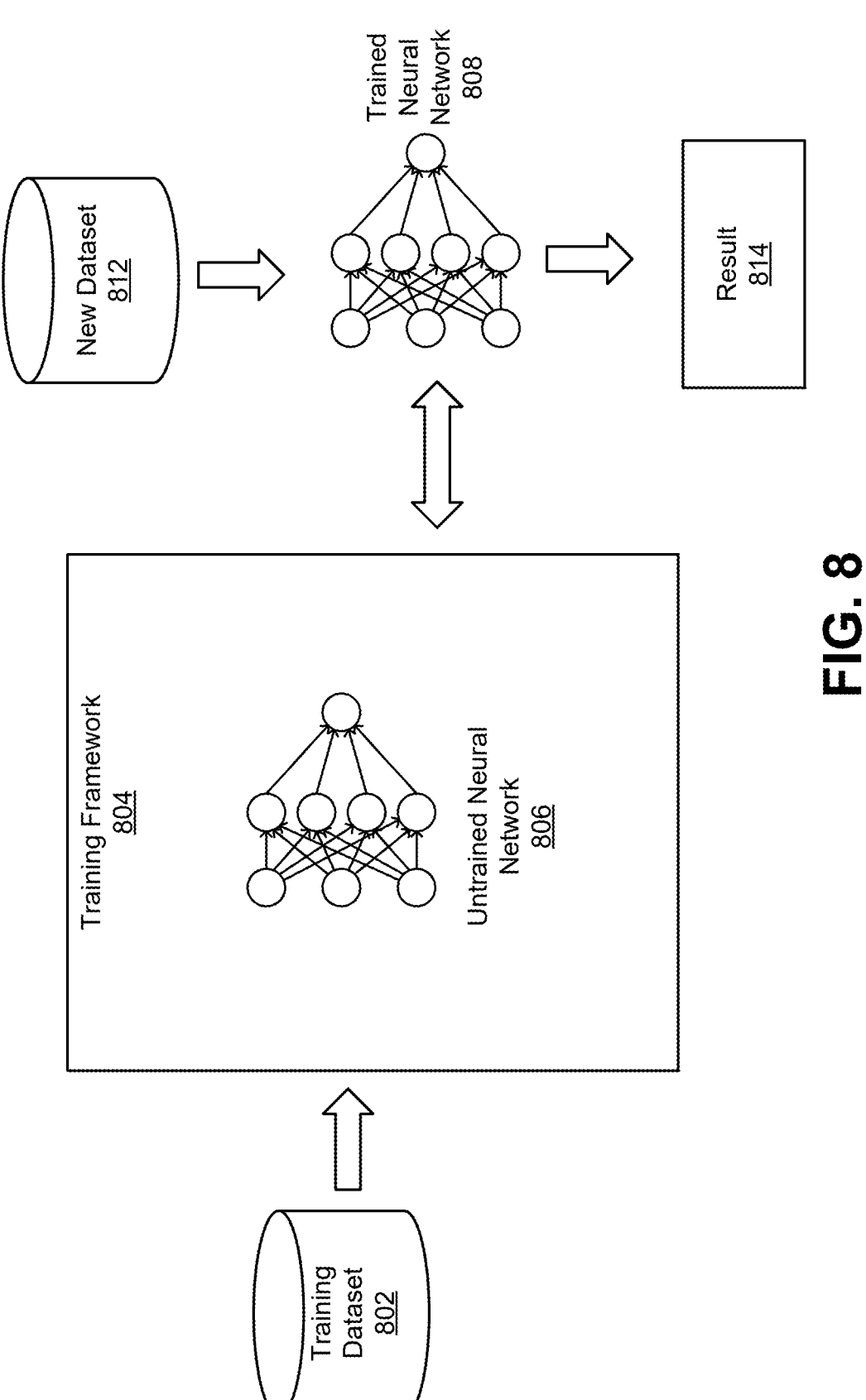
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a Tensor-Flow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pretraining using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
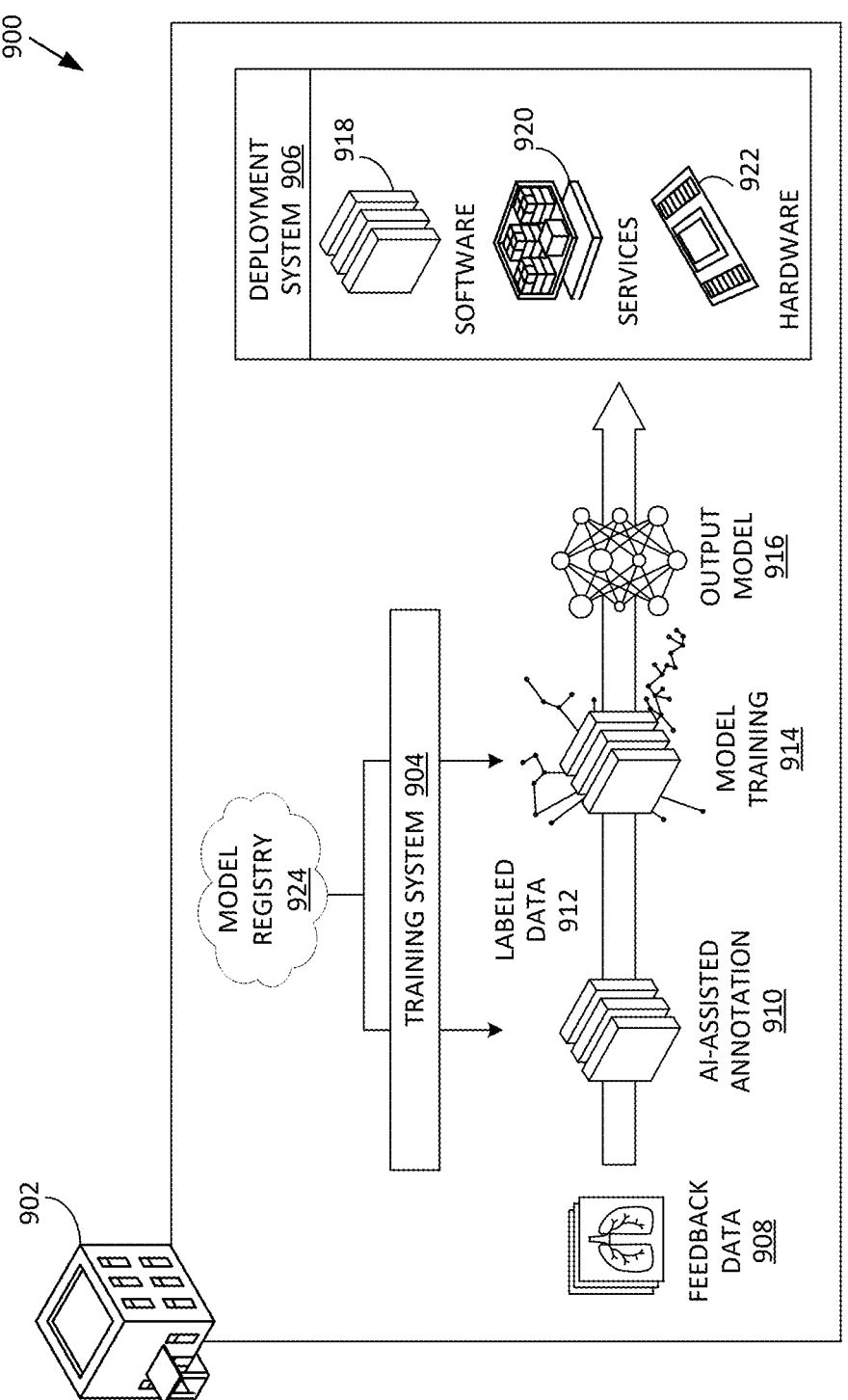
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo preprocessing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
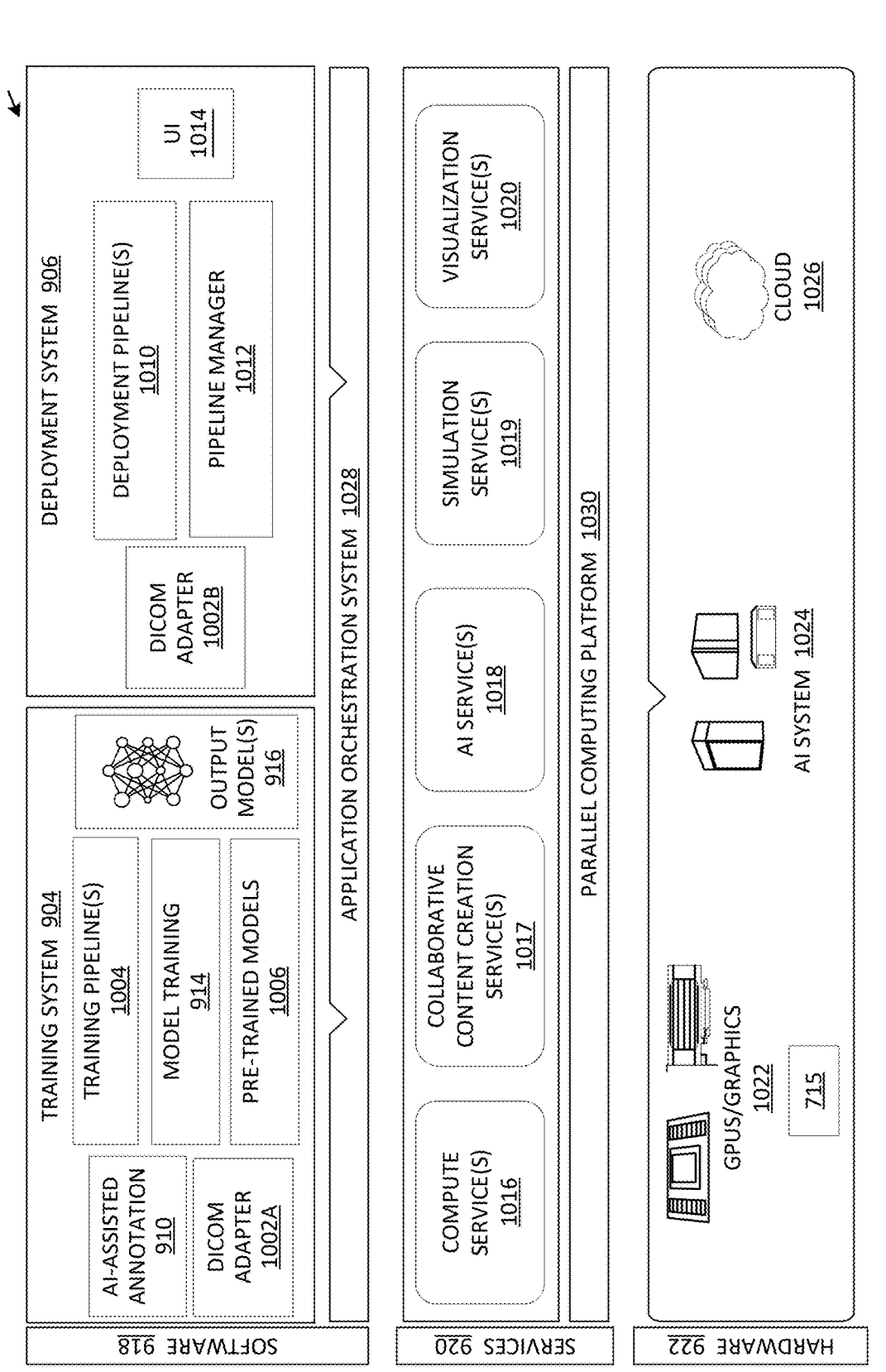
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904. In at least one embodiment, training system 904 and deployment system 906 may include DICOM adapters 1002A and 1002B.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as raytracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA® and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed.

No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
receiving, via a user interface (UI), a natural language (NL) query associated with one or more malfunction indicators present in a test log and indicative of a malfunction state of the system, the malfunction state of the system detected by a diagnostic tool having access to at least one of a hardware of the system or a software operating on the system;
providing, to a language model (LM) trained using documentation associated with the system, an input comprising a prompt that is based at least on the NL query and one or more embeddings associated with a test log produced by the diagnostic tool and representative of the malfunction state of the system;
receiving, from the LM, a response to the NL query, the response comprising one or more instructions associated with resolution of the malfunction state of the system that comprises at least one of:
replacement of a component of the system,
installation of software on the system, or
reinstallation of the software on the system; and
causing the UI to display the one or more instructions.

2. The method of claim 1, wherein the malfunction state of the system is detected in association with performed diagnostics of the system.

3. The method of claim 1, wherein resolving the malfunction state of the system comprises:
generating, responsive to the performed action, an updated test log associated with an updated state of the system;
providing, to the LM, an updated prompt that is based at least on the updated test log;
receiving, from the LM, an updated response to the NL query, the updated response comprising one or more additional instructions associated with resolution of the updated state of the system.

4. The method of claim 1, further comprising, prior to receiving the NL query:
providing, to the LM, an initial input based at least on an initial NL query; and
receiving, from the LM, an initial response to the initial NL query, the initial response comprising one or more initial instructions; and
wherein the one or more malfunction indicators are indicative of an initial attempt to resolve the malfunction state of the system.

5. The method of claim 1, wherein the LM comprises a large language model.

6. The method of claim 1, wherein the documentation associated with the system comprises one or more of:
a diagnostic documentation for the system, a system architecture documentation for the system, or
one or more training diagnostic logs associated with historical or simulated malfunctions of the system.

7. The method of claim 1, wherein the NL query is generated responsive to at least one of:
a scheduled maintenance of the system,
a hardware update of the system,
a software update of the system,
a firmware update of the system, or
an inoperable condition of the system.

8. The method of claim 1, wherein the query comprises at least one of a text prompt, a speech prompt, an audio prompt, or an image prompt.

9. A method comprising:
generating training data comprising:
a natural language (NL) query associated with one or more malfunction indicators indicative of a malfunction state of a system,
one or more embeddings generated by a trained embedding generator, documentation associated with the system, and
a training diagnostic log associated with the malfunction state of the system;
using the training data to cause a processing device to train a language model (LM) to generate a NL response to the NL query, the NL response comprising one or more instructions associated with resolution of the malfunction state of the system,
wherein the LM comprises at least one billion neuron parameters arranged in a plurality of neuron layers,
wherein to train the LM, the processing device is to backpropagate an error through multiple neuron layers of the plurality of neuron layers, and
wherein the one or more instructions associated with resolution of the malfunction state of the system comprises at least one of:
instructions associated with replacement of a component of the system,
instructions associated with installation of software on the system, or
instructions associated with reinstallation of the software on the system.

10. The method of claim 9, wherein the documentation associated with the system comprises one or more of:
a diagnostic documentation for the system, or
a system architecture documentation for the system.

11. The method of claim 9, wherein the training diagnostic log comprises at least one of:
a diagnostic log associated with performed diagnostics of the system, or
a synthetic diagnostic log for the malfunction state of the system.

12. The method of claim 9, wherein the training data further comprises:
a sample NL response to the NL query, and
wherein using the training data to train the LM comprises:
applying the training data to the LM to obtain a training NL response; and
causing, using a difference between the training NL response and the sample NL response, one or more parameters of the LM to be modified.

13. The method of claim 9, wherein using the training data to train the LM comprises:
applying the training data to the LM to obtain a training NL response;

obtaining an evaluation score characterizing effectiveness of the training NL response for resolution of the malfunction state of the system; and causing, using the evaluation score, one or more parameters of the LM to be modified.

14. The method of claim 9, wherein the LM comprises a neural network-based large language model.

15. A system comprising:

one or more processing units to:

receive, via a user interface (UI), a natural language (NL) query associated with one or more malfunction indicators present in a test log and indicative of a malfunction state of the system, the malfunction state of the system detected by a diagnostic tool having access to at least one of a hardware of the system or a software operating on the system;

provide, to a language model (LM) trained using documentation associated with the system, an input comprising a prompt that is based at least on the NL query and the one or more embeddings associated with a test log produced by the diagnostic tool and representative of the malfunction state of the system;

receive, from the LM, a response to the NL query, the response comprising one or more instructions associated with resolution of the malfunction state of the system that comprises at least one of:

replacement of a component of the system, installation of software on the system, or reinstallation of the software on the system; and cause the UI to display the one or more instructions.

16. The system of claim 15, wherein the malfunction state of the system is detected in association with performed diagnostics of the system.

17. The system of claim 16, wherein to resolve the malfunction state of the system, the one or more processing units are to:

generate, responsive to the performed action, an updated test log associated with an updated state of the system;

provide, to the LM, an updated prompt that is based at least on the updated test log;

receive, from the LM, an updated response to the NL query, the updated response comprising one or more additional instructions associated with resolution of the updated state of the system.

18. The system of claim 15, wherein the documentation associated with the system comprises one or more of:

a diagnostic documentation for the system, a system architecture documentation for the system, or one or more training diagnostic logs associated with historical or simulated malfunctions of the system.

19. The system of claim 15, wherein the LM communicates with at least one of an application programming interface (API) or a plug-in to retrieve additional information related to the NL query.

20. The system of claim 15, wherein the system is comprised in at least one of:

an in-vehicle infotainment system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system for generating or presenting at least one of virtual reality content, mixed reality content, or augmented reality content;

a system implemented using a robot;

a system for performing one or more conversational AI operations;

a system implementing one or more large language models (LLMs);

a system implementing one or more language models;

a system for performing one or more generative AI operations;

a system for generating synthetic data;

a system incorporating one or more virtual machines (VMs);

a system implemented at least partially in a data center; or a system implemented at least partially using cloud computing resources.

* * * * *